(12) United States Patent
Gong et al.

(10) Patent No.: US 10,122,210 B2
(45) Date of Patent: Nov. 6, 2018

(54) MANAGING AN ENERGY STORAGE SYSTEM

(71) Applicant: Younicos, Inc., Kyle, TX (US)

(72) Inventors: Huaxin Gong, Kyle, TX (US); Audrey Fogarty, Austin, TX (US)

(73) Assignee: YOUNICOS, INC., Kyle, TX (US)

( * ) Notice: Subject to any disclaimer, the term of this patent is extended or adjusted under 35 U.S.C. 154(b) by 207 days.

(21) Appl. No.: 14/655,655

(22) PCT Filed: Dec. 27, 2013

(86) PCT No.: PCT/US2013/078082
§ 371 (c)(1),
(2) Date: Jun. 25, 2015

(87) PCT Pub. No.: WO2014/106105
PCT Pub. Date: Jul. 3, 2014

(65) Prior Publication Data
US 2015/0349587 A1    Dec. 3, 2015

Related U.S. Application Data
(60) Provisional application No. 61/746,831, filed on Dec. 28, 2012.

(51) Int. Cl.
*H02J 15/00*  (2006.01)
*G05B 15/02*  (2006.01)
(Continued)

(52) U.S. Cl.
CPC ............. *H02J 15/00* (2013.01); *G05B 15/02* (2013.01); *G06Q 50/06* (2013.01); *H02J 3/32* (2013.01);
(Continued)

(58) Field of Classification Search
CPC .... H02J 15/00; H02J 3/32; H02J 3/382; H02J 3/386; H02J 3/383; H02J 2007/005;
(Continued)

(56) References Cited

U.S. PATENT DOCUMENTS 7,752,145 B2   7/2010  Kelty
2004/0263116 A1  12/2004  Doruk et al.
(Continued)

FOREIGN PATENT DOCUMENTS

CN    102799115    11/2012
EP    2472278    7/2012
(Continued)

OTHER PUBLICATIONS

J. Kondoh et al. Electrical energy storage systems for energy networks, Feb. 7, 2000, Elsevier Sceine Ltd, Energy Conversion and Management 41 (2000) 1863-1874.*
(Continued)

*Primary Examiner* — Robert E Fennema
*Assistant Examiner* — Marzia T Monty
(74) *Attorney, Agent, or Firm* — Toler Law Group, PC (57) ABSTRACT

A system includes an energy storage system configured to supply energy to an electrical grid and a control system coupled to an energy management system of the electrical grid and configured to control the energy storage system. The control system receives one or more commands from the energy management system, and in response, executes a command compliance routine to charge or discharge energy from the energy storage system to the electric grid in accordance with the one or more commands. The control system also receives one or more system condition values from the energy storage system and one or more market condition values for the electric grid and executes a management routine to charge or discharge energy from the
(Continued)

energy storage system to the electric grid based on the system condition values and the market condition values.

20 Claims, 4 Drawing Sheets

(51) Int. Cl.
    *H02J 3/32*     (2006.01)
    *H02J 3/38*     (2006.01)
    *G06Q 50/06*     (2012.01)
    *H02J 7/00*     (2006.01)

(52) U.S. Cl.
    CPC ............... *H02J 3/382* (2013.01); *H02J 3/383* (2013.01); *H02J 3/386* (2013.01); *H02J 2007/005* (2013.01); *Y02E 10/563* (2013.01); *Y02E 10/566* (2013.01); *Y02E 10/763* (2013.01); *Y02E 70/30* (2013.01)

(58) Field of Classification Search
    CPC ...... G06Q 50/06; G05B 15/02; Y02E 10/763; Y02E 10/563; Y02E 10/566; Y02E 70/30
    See application file for complete search history.

(56) References Cited

U.S. PATENT DOCUMENTS

| | | | |
|---|---|---|---|
| 2005/0142405 A1* | 6/2005 | Nagamitsu | G06Q 50/06 705/412 |
| 2007/0198132 A1* | 8/2007 | Yamamoto | H02J 7/1446 700/286 |
| 2008/0167756 A1* | 7/2008 | Golden | G05B 15/02 700/297 |
| 2008/0215199 A1* | 9/2008 | Aoyama | H02J 7/1423 701/22 |
| 2009/0200988 A1 | 8/2009 | Bridges et al. | |
| 2010/0090532 A1 | 4/2010 | Shelton et al. | |
| 2010/0179862 A1* | 7/2010 | Chassin | G06Q 10/06 705/412 |
| 2011/0047052 A1* | 2/2011 | Cornish | B60L 11/1861 705/30 |
| 2011/0156391 A1* | 6/2011 | Kirchner | F03D 7/0284 290/44 |
| 2011/0178959 A1* | 7/2011 | Nakajima | B60L 11/1824 705/412 |
| 2011/0273129 A1 | 11/2011 | Coe et al. | |
| 2011/0282513 A1 | 11/2011 | Son et al. | |
| 2012/0056588 A1 | 3/2012 | Cai et al. | |
| 2012/0123604 A1* | 5/2012 | Littrell | H01M 10/44 700/295 |
| 2012/0176095 A1* | 7/2012 | Okuda | H01M 10/44 320/134 |
| 2012/0249048 A1 | 10/2012 | Nishibayashi et al. | |
| 2012/0286723 A1* | 11/2012 | Ukita | G06Q 10/06 320/107 |
| 2013/0013123 A1* | 1/2013 | Ozaki | B60L 11/1842 700/295 |
| 2013/0166081 A1* | 6/2013 | Sanders | G05B 15/02 700/286 |

FOREIGN PATENT DOCUMENTS

| | | |
|---|---|---|
| JP | 2003/259552 | 9/2003 |
| JP | 2010/512727 | 4/2010 |
| WO | WO2011/065498 | 6/2011 |
| WO | WO2012/050014 | 4/2012 |

OTHER PUBLICATIONS

Singaporean Written Opinion on Patentability in related application SG 11201505082P dated Feb. 12, 2016.
Written Opinion of the International Search Authority in related application PCT/US2013/078082 dated Jun. 28, 2015.
Japanese Office Action regarding Application No. JP2015-550816 dispatched date Jul. 5, 2016.
CN Notice of First Office Action Document regarding Application No. 201380069550.0 dated Nov. 4, 2016.
EP Extended Search Report dated Jun. 6, 2016 regarding EP Application No. 13866621.9.
PCT Notification Concerning Transmittal of International Preliminary Report on Patentability dated Jun. 30, 2015 for PCT/US2013/078082, 8 pages.

* cited by examiner

MANAGING AN ENERGY STORAGE SYSTEM

CROSS-REFERENCE TO RELATED APPLICATIONS

The present application is a National Stage of PCT International Application No. PCT/US13/078082, filed Dec. 27, 2013, which claims the benefit of U.S. Provisional Application Ser. No. 61/746,831, filed Dec. 28, 2012. The disclosures of the prior applications are considered part and are incorporated by reference in the disclosure of this application.

TECHNICAL FIELD

This disclosure relates generally to electronics and more particularly to managing an energy storage system in an energy market.

BACKGROUND

Energy storage systems can be coupled to an electrical grid for one or more of various purposes. For example, an energy storage system can be used in conjunction with an intermittent power source (e.g., wind farm) to absorb excess power during a ramp up and/or to supplement power output during a ramp down.

Generally, energy storage systems are implemented using one or more energy storage devices that have a fixed storage capacity. Having a fixed storage capacity typically limits a device's ability to mitigate the risk of exceeding a ramp rate limit (i.e., a ramp rate violation). For example, a system having a 50% state of charge may be able to avoid a ramp rate violation in either direction for finite, and approximately equal, periods of time, assuming equal, worst-case-rates of change and equal ramp rate limits.

In operation, such systems may implement a target state of charge (SOC) around which the storage device is managed. When the SOC of the device drops below this target or moves beyond this target, the energy storage device is controlled such that the SOC returns to the target SOC in preparation for the next event.

SUMMARY

A system includes an energy storage system configured to supply energy to an electrical grid and a control system coupled to an energy management system of the electrical grid and configured to control the energy storage system. The control system receives one or more commands from the energy management system, and in response, executes a command compliance routine to charge or discharge energy from the energy storage system to the electric grid in accordance with the one or more commands. The control system also receives one or more system condition values from the energy storage system and one or more market condition values for the electric grid and executes a management routine to charge or discharge energy from the energy storage system to the electric grid based on the system condition values and the market condition values.

Particular implementations of the control system can provide one or more of the following advantages: An energy storage system can simultaneously participate in an energy market and independently manage a state of charge of the energy storage system; the energy storage system can charge when energy is less expensive and discharge when energy is more expensive, improving profits; the energy storage system can charge when its state of charge is below a target state of charge and discharge when its state of charge is above a threshold, improving availability to comply with commands from an energy management system.

The details of one or more disclosed implementations are set forth in the accompanying drawings and the description below. Other features, aspects, and advantages will become apparent from the description, the drawings and the claims.

DETAILED DESCRIPTION

Figure 1:
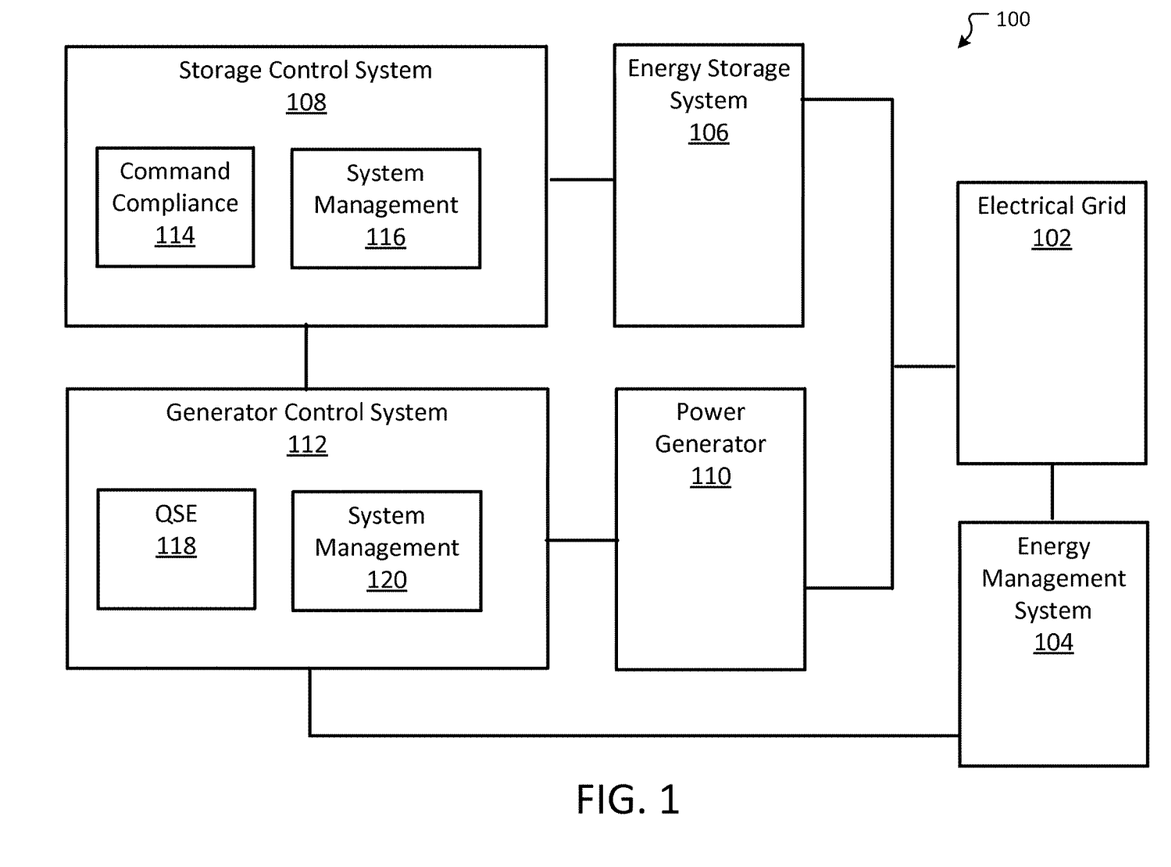
FIG. 1 is a block diagram of an example electrical distribution system including an electrical grid, an energy management system that manages the grid, an energy storage system, and an optional power generator, e.g., a wind farm or a solar power generator.

FIG. 1 is a block diagram of an example electrical distribution system 100 including an electrical grid 102, an energy management system 104 that manages the grid, an energy storage system 106, and an optional power generator 110, e.g., a wind farm or a solar power generator. The electrical distribution system may include other components to manage the connections between the energy storage system, the power generator, and the grid, e.g., a substation including one or more transformers, fault protection equipment, and the like.

The energy management system is a system of one or more computers that is configured to manage power on the electrical grid. The energy management system can provide various services to ensure that users of the grid are able to meet their power requirements. For example, the energy management system can schedule various power generators to provide power at different times. An example of an energy management system is the Electric Reliability Council of Texas (ERCOT) energy management system (EMS).

The energy management system communicates over a data communications network with a generator control system 112 that is configured to control the power generator. The generator control system executes a system management routine 120 to control the power generator. The system management routine can, for example, monitor the output of the intermittent power generator and control power generation configurations (e.g., change the yaw or pitch or both of the blades on a wind turbine).

The generator control system also executes a qualified scheduling entity (QSE) routine 118. The QSE routine communicates with the energy management system to schedule power output from the power generator to the grid. In some implementations, the QSE routine submits offers to sell energy from the power generator to the energy management system, and in some implementations, the QSE submits bids to buy energy. For example, the QSE can participate in a Day-Ahead Market or a Real-Time Market or both. The QSE can also communicate with a storage control system 108 of one or more computers configured to control the energy storage system 106.

The storage control system controls the energy storage system to provide one or more services to assist the power generator or the grid or both. For example, the storage control system can provide a ramp rate mitigation service to prevent power from the power generator from increasing or decreasing at any more than a threshold rate. Other examples of services include grid voltage regulation, grid frequency regulation, and power smoothing. Energy storage systems are described further below with reference to FIG. 2.

The storage control system executes a command compliance routine 114 to comply with commands from the energy management system. The energy management system can send the commands via the generator control system or directly to the storage control system or via any other appropriate data path.

For example, the energy management system can send a command to discharge by scheduling a time for the energy storage system to discharge with the QSE routine of the generator control system. As another example, the energy management system can send a command to charge or discharge by scheduling a time with the QSE routine for the energy storage system to provide a ramp rate mitigation service to the power generator. The command compliance routine, in operation, generally causes the energy storage system to comply with the commands, unless there is some reason not to comply, e.g., if the energy storage system is depleted.

The storage control system also executes a system management routine 116. The system management routine receives system condition values from the energy storage system and market condition values for the grid and determines whether to charge or discharge or do nothing. In this manner, the system management routine can independently manage the energy storage system while not need to comply with any commands from the energy management system.

For example, the system management routine can cause the energy storage system to maintain a target state of charge, to charge when energy costs are relatively low, and to discharged when energy costs are relatively high. System management routines are described further below with reference to FIG. 3.

The architecture of some or all of the devices used to implement the control systems can be configured for easy deployment and trouble shooting. For example, the control systems can include different layers, each having a primary purpose. The storage control system can reduce system risk and reduce system downtime. The storage control system can be expanded in time, for example, as the operation history can be used to improve various performance factors.

Figure 2:
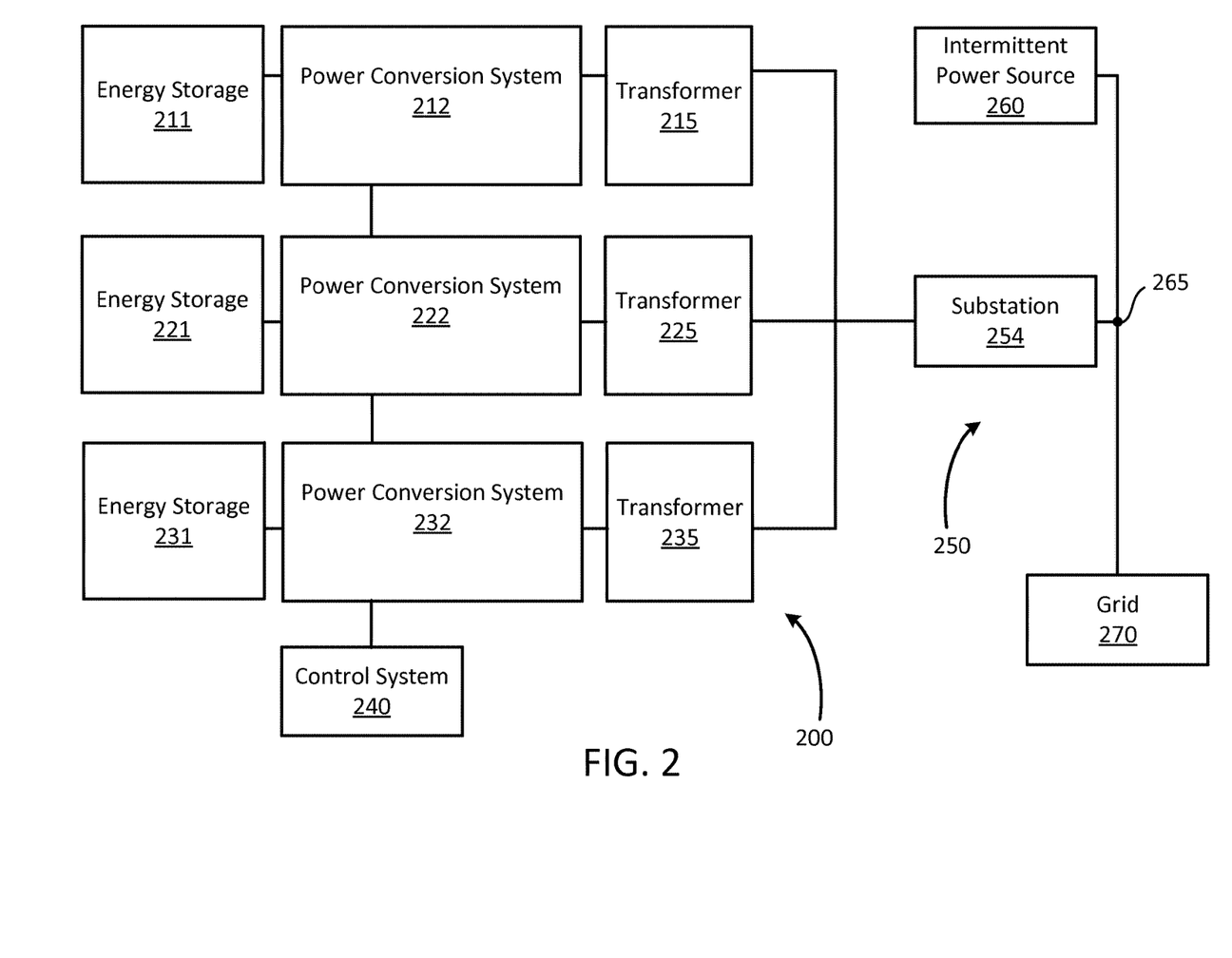
FIG. 2 is a block diagram of an example energy storage system coupled to a distribution network.

FIG. 2 is a block diagram of an example energy storage system 200 coupled to a distribution network 250. The energy storage system includes energy storage arrays 211, 221, and 231. The energy storage arrays are each coupled to a respective power conversion system 212, 222, and 232, and the power conversion systems are each coupled to a respective transformer 215, 225, and 235. The power conversion systems can be, for example, bidirectional inverters. In some implementations, the energy storage arrays include batteries coupled in series, in parallel, or a series-parallel configuration. In other implementations, the energy storage arrays may include, for example, capacitors, flywheels, super-conducting magnetics, or combinations thereof.

The transformers are coupled to a substation 254 that is coupled to an intermittent power source 260 and a grid 270, e.g., the grid 102 of FIG. 1. The intermittent power source can be, for example, a wind farm or a solar power generator. In operation, the energy storage system provides one or more support services to the intermittent power source or one or more ancillary services to the grid or both.

The energy storage system includes a control system 240 operatively linked to each of the inverters through a communication interface. The control system provides the inverters control signals and/or data via the communication interface, including, for example, target active and reactive power settings, distribution network status information, and activate/standby control commands. Distribution network status information includes, for example, voltage, current, active power, reactive power, and frequency information derived, e.g., from one or more sensors coupled to the grid. Based on this information, the control system can control the operation of each power conversion system so that the power management system appears to the distribution network as a single high capacity system.

The control system issues target active power settings ("P commands") and target reactive power settings ("Q commands") to each of the inverters based on system performance requirements. For example, in a frequency regulation mode, the control system may issue a P command to increase the amount of active power transferred from an energy storage array to the distribution network in response to detecting a drop in frequency on the distribution network.

Further, in a voltage regulation mode, the control system can issue a Q command to increase the amount of reactive power transferred between an energy storage array and the distribution network in response to detecting a voltage drop. Moreover, in a VAR regulation mode, the control system can issue a Q command to adjust the amount of reactive power transferred between an energy storage array and the distribution network in response to an out-of-limit condition.

The control system can issue P and Q commands as necessary to manage power transferred at a point of interconnection (POI) 265 between the intermittent power source and the grid. For example, the control system can issue a P command to absorb power generated by the intermittent power source to avoid violating a positive ramp-rate limit during a sudden increase in power output by the intermittent power source. Similarly, the control system can issue a P command to provide power to distribution network 250 upon a sudden drop in power output by the intermittent power source to avoid violating a negative ramp-rate limit.

Figure 3:
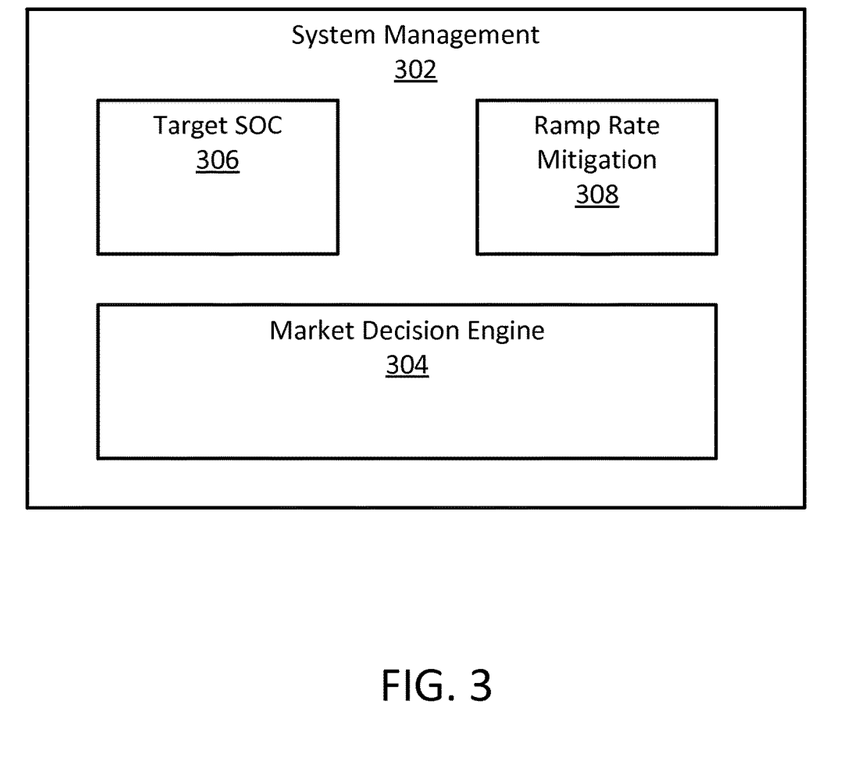
FIG. 3 is a block diagram of an example system management routine.

FIG. 3 is a block diagram of an example system management routine 302, e.g., the system management routine 116 for the storage control system 108 of FIG. 1. The system management routine includes a market decision engine (MDE) 304 that receives system condition values and market condition values and determines whether to charge or discharge the energy storage system. The market decision engine can interact with other optional modules, e.g., a target state of charge module 306 and a ramp rate mitigation module 308.

The MDE can receive the market condition values from an energy management system, a qualified scheduling entity, or another source. Typically the market condition values include the price of energy in one or more energy markets. In some implementations, the market condition values can specify trends in prices or other financial information. In general, the MDE favors discharging when the price of energy is high and favors charging when the price of energy is low.

The system condition values can be received or measured from the energy storage system. Typically the system condition values include the state of charge of one or more energy storage devices. In some implementations, the system condition values include information from the power generator or environmental information, e.g., wind forecasts. In general, the MDE favors discharging when the state of charge is above a target state of charge and favors charging when the state of charge is below the target state of charge.

In some cases, the MDE resolves conflicts when some information indicates discharging and some information indicates charging. For example, if the state of charge is below the target state of charge but the price of energy is above a target price of energy, the MDE can determine to either maintain the current level of charge or to charge or discharge at a reduced rate. For example, the MDE can compare the difference between the state of charge and the target state of charge with the difference between the price of energy and the target price of energy, optionally modified by a multiplier or other process. If one difference is greater than the other, the MDE can decide to take an action based on the larger difference.

Figure 4:
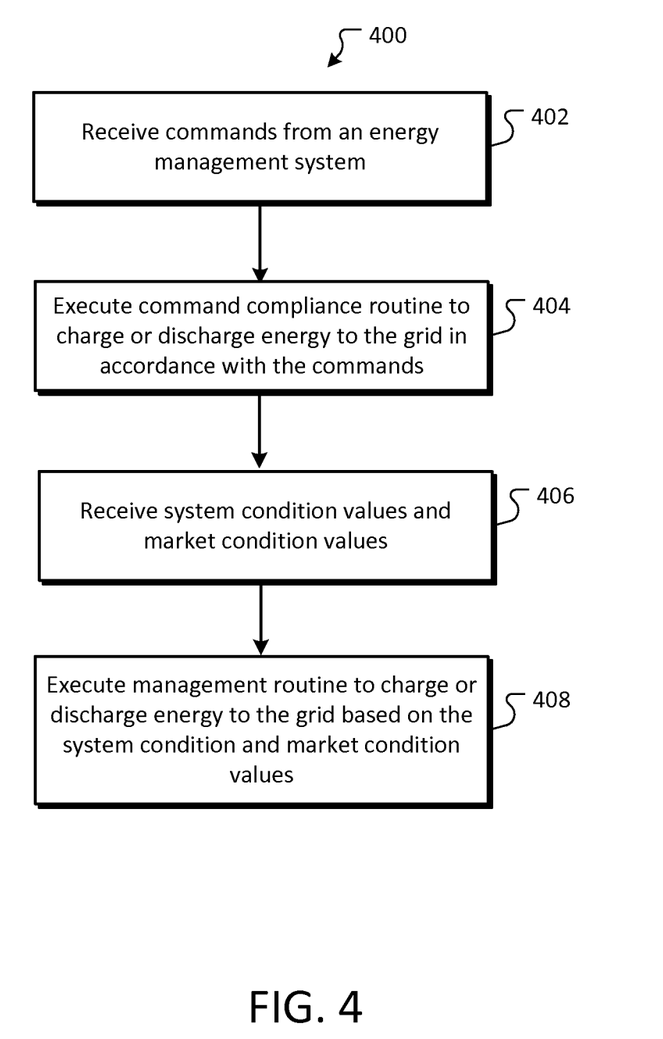
FIG. 4 is a flow diagram of a method performed by a control system of an energy storage system.

FIG. 4 is a flow diagram of a method 400 performed by a control system of an energy storage system. For example, the control system can be the storage control system 108 of FIG. 1 executing the command compliance routine 114 and the system management routine 116.

The control system receives one or more receiving one or more commands from an energy management system of an electric grid (402). In response, the control system executes a command compliance routine to charge or discharge energy from the energy storage system to the electric grid in accordance with the one or more commands (404).

The control system receives one or more system condition values from the energy storage system and one or more market condition values for the electric grid (406). The market condition values can specify a price of energy on the grid. For example, the control system can receive the market condition values from a qualified scheduling entity (QSE), or from an energy management system of the grid, or from a different source. In some implementations, the management routine favors charging the energy storage system when the price of energy is below a threshold price and favors discharging the energy storage system when the price of energy is above a different threshold price.

In some implementations, the energy storage system includes at least one energy storage device coupled to the grid by a bidirectional power conversion system. Receiving the one or more system condition values can include receiving a state of charge of the energy storage device.

The control system executes a management routine to charge or discharge energy from the energy storage system to the electric grid based on the system condition values and the market condition values (408). In some implementations, executing the management routine includes executing a target state of charge routine that favors discharging the energy storage device when the state of charge is above a target state of charge and favors charging the energy storage device when the state of charge is at or below the target state of charge.

In some implementations, executing the management routine includes receiving one or more power system values from an intermittent power source configured to supply power to the grid. The power system values specify, e.g., an amount of power being supplied by the intermittent power source to the grid. The control system can determine to charge or discharge the energy storage device based on the one or more power system values. The control system can execute a ramp rate mitigation routine that discharges the energy storage device when the intermittent power source is supplying power that is decreasing faster than a first threshold rate and charges the energy storage device when the intermittent power source is supplying power that is increasing faster than a second threshold rate.

In some implementations, the energy management system is configured to send commands to the control system to discharge the energy storage device, but not commands to charge the energy storage device. The control system determines to charge the energy storage device when its state of charge is low, or when the price of energy is low, or both. The control system can then determine to discharge the energy storage device when its state of charge is high, or the price of energy is high, or both. In those implementations, the control system may need permission to discharge the energy storage device.

The control system can, in response to determining to discharge the energy storage device, send a request to the energy management system to discharge. The control system then receives a reply from the energy management system, and if the reply authorizes the discharge, the control system discharges the energy storage system as authorized by the reply to the request.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

What is claimed is:

1. A method performed by a control system of an energy storage system, the method comprising:
   receiving one or more commands from an energy management system of an electrical grid, and in response, executing a command compliance routine to charge or discharge energy from the energy storage system to the electrical grid in accordance with the one or more commands;
   and receiving one or more system condition values from the energy storage system and one or more market condition values for the electrical grid and executing a management routine to charge or discharge energy from the energy storage system to the electrical grid by comparing a first numerical value to a second numerical value, the first numerical value based on a first difference between the one or more system condition values and a first target value, and the second numerical value based on a second difference between the one or more market condition values and a second target value, wherein, in response to determining to discharge the energy storage system, executing the management routine comprises:
   sending a request to the energy management system to discharge;
   receiving a reply to the request from the energy management system specifying that discharging is authorized; and
   discharging the energy storage system as authorized by the reply to the request.

2. The method of claim 1, wherein the energy storage system comprises at least one energy storage device coupled to the electrical grid by a bidirectional power conversion system, and wherein receiving the one or more system condition values comprises receiving a state of charge of the at least one energy storage device.

3. The method of claim 2, wherein the first target value is a target state of charge, and wherein executing the management routine comprises executing a target state of charge routine that favors discharging the at least one energy storage device when the state of charge is above the target state of charge and favors charging the at least one energy storage device when the state of charge is at or below the target state of charge.

4. The method of claim 2, wherein the energy storage system is coupled to an intermittent power source configured to supply power to the electrical grid, and wherein executing the management routine comprises receiving one or more power system values from the intermittent power source and determining to charge or discharge the at least one energy storage device based on the one or more power system values, and wherein the power system values specify an amount of power being supplied by the intermittent power source to the electrical grid.

5. The method of claim 1 wherein at least one of the first difference or the second difference is modified based on a multiplier.

6. The method of claim 2, wherein the energy storage system is coupled to an intermittent power source configured to supply power to the electrical grid, and wherein executing the management routine comprises executing a ramp rate mitigation routine that discharges the at least one energy storage device when the intermittent power source is supplying power at a rate that is decreasing faster than a first threshold rate and charges the at least one energy storage device when the intermittent power source is supplying power at a rate that is increasing faster than a second threshold rate.

7. The method of claim 1, wherein the one or more market condition values specify a price of energy on the electrical grid, and wherein receiving the one or more market condition values comprises receiving the one or more market condition values from the energy management system.

8. The method of claim 4, wherein the second target value is a threshold price of energy, and wherein the management routine favors charging the energy storage system when a price of energy is below the threshold price of energy.

9. The method of claim 6, wherein the management routine favors discharging the energy storage system when a price of energy is above a different threshold price.

10. The method of claim 1, wherein the one or more commands includes scheduling a particular discharge event at a particular time.

11. A system comprising:
   an energy storage system configured to supply energy to an electrical grid;
   and a control system configured to be coupled to an energy management system of the electrical grid and configured to control the energy storage system by performing operations comprising:
   receiving one or more commands from the energy management system, and in response, executing a command compliance routine to charge or discharge energy from the energy storage system to the electrical grid in accordance with the one or more commands; and receiving one or more system condition values from the energy storage system and one or more market condition values for the electrical grid and executing a management routine to charge or discharge energy from the energy storage system to the electrical grid by comparing a first numerical value to a second numerical value, the first numerical value based on a first difference between the one or more system condition values and a first target value, and the second numerical value based on a second difference between the one or more market condition values and a second target value, wherein, in response to determining to discharge the energy storage system:

sending a request to the energy management system to discharge;

receiving a reply to the request from the energy management system specifying that discharging is authorized; and discharging the energy storage system as authorized by the reply to the request.

12. The system of claim 11, wherein the energy storage system comprises at least one energy storage device coupled to the electrical grid by a bidirectional power conversion system, and wherein receiving the one or more system condition values comprises receiving a state of charge of the at least one energy storage device.

13. The system of claim 12, wherein the first target value is a target state of charge, and wherein executing the management routine comprises executing a target state of charge routine that favors discharging the at least one energy storage device when the state of charge is above the target state of charge and favors charging the at least one energy storage device when the state of charge is at or below the target state of charge.

14. The system of claim 12, wherein the energy storage system is configured to couple to an intermittent power source configured to supply power to the electrical grid, and wherein executing the management routine comprises receiving one or more power system values from the intermittent power source and determining to charge or discharge the at least one energy storage device based on the one or more power system values.

15. The system of claim 14, wherein the power system values specify an amount of power being supplied by the intermittent power source to the electrical grid.

16. The system of claim 12, wherein the energy storage system is configured to couple to an intermittent power source configured to supply power to the electrical grid, and wherein executing the management routine comprises executing a ramp rate mitigation routine that discharges the at least one energy storage device when the intermittent power source is supplying power at a rate that is decreasing faster than a first threshold rate and charges the at least one energy storage device when the intermittent power source is supplying power at a rate that is increasing faster than a second threshold rate.

17. The system of claim 11, wherein the one or more market condition values specify a price of energy on the electrical grid, and wherein receiving the one or more market condition values comprises receiving the one or more market condition values from the energy management system.

18. The system of claim 17, wherein the second target value is a threshold price of energy, and wherein the management routine favors charging the energy storage system when the price of energy is below the threshold price of energy.

19. The system of claim 18, wherein the management routine favors discharging the energy storage system when the price of energy is above a different threshold price.

20. The system of claim 11, wherein the one or more commands includes scheduling a particular charge event at a particular time.

* * * * *